United States Patent [19]

Geddes et al.

[11] 4,201,446
[45] May 6, 1980

[54] FIBER OPTIC TEMPERATURE SENSOR USING LIQUID COMPONENT FIBER

[75] Inventors: John J. Geddes, Minneapolis; G. Benjamin Hocker, Minnetonka, both of Minn.

[73] Assignee: Honeywell Inc., Minneapolis, Minn.

[21] Appl. No.: 953,154

[22] Filed: Oct. 20, 1978

[51] Int. Cl.² ............... G02B 5/16; G01K 11/12
[52] U.S. Cl. .................. 350/96.29; 73/355 R; 350/96.10; 350/96.32; 356/44
[58] Field of Search .......... 350/96.29, 96.10, 96.32; 356/44, 133; 73/355 R

[56] References Cited

U.S. PATENT DOCUMENTS

| | | | |
|---|---|---|---|
| 3,051,038 | 8/1962 | Duke | 350/96.29 |
| 3,626,758 | 12/1971 | Stewart et al. | 73/355 R |
| 3,841,731 | 10/1974 | Midwinter | 350/96.29 |
| 4,016,761 | 4/1977 | Rozzell et al. | 73/355 R |
| 4,136,566 | 1/1979 | Christensen | 356/44 |

Primary Examiner—Stewart J. Levy
Attorney, Agent, or Firm—Omund R. Dahle

[57] ABSTRACT

This invention provides apparatus for remote temperature sensing by means of fiber optics in which the sensor is optical and passive, with no electrical power required at the sensor. The temperature-sensing section of the fiber optic makes use of a transparent liquid as core or cladding and in which the transparent liquid has a temperature-dependent index of refraction.

6 Claims, 5 Drawing Figures

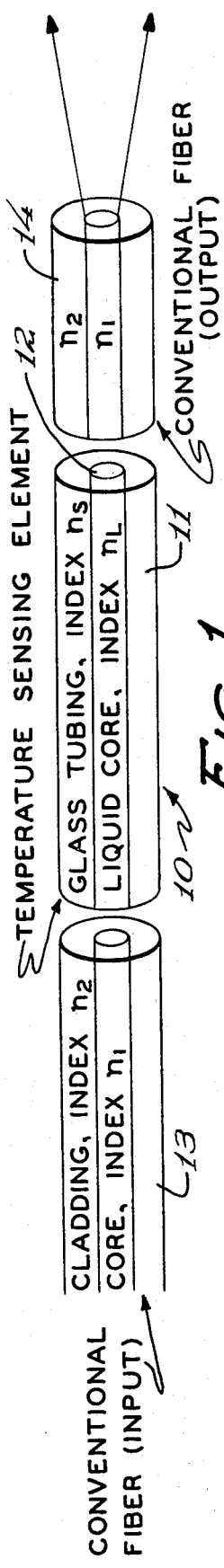
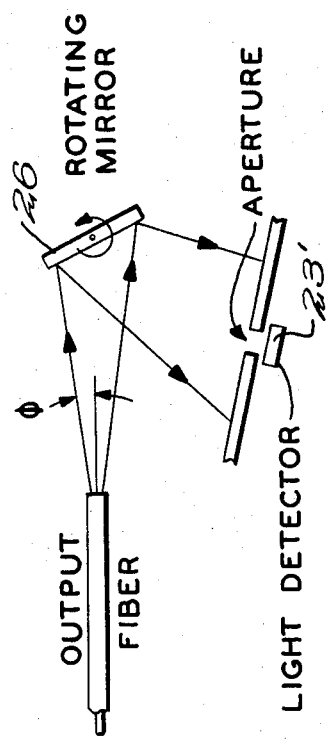
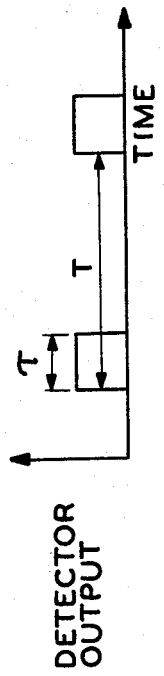
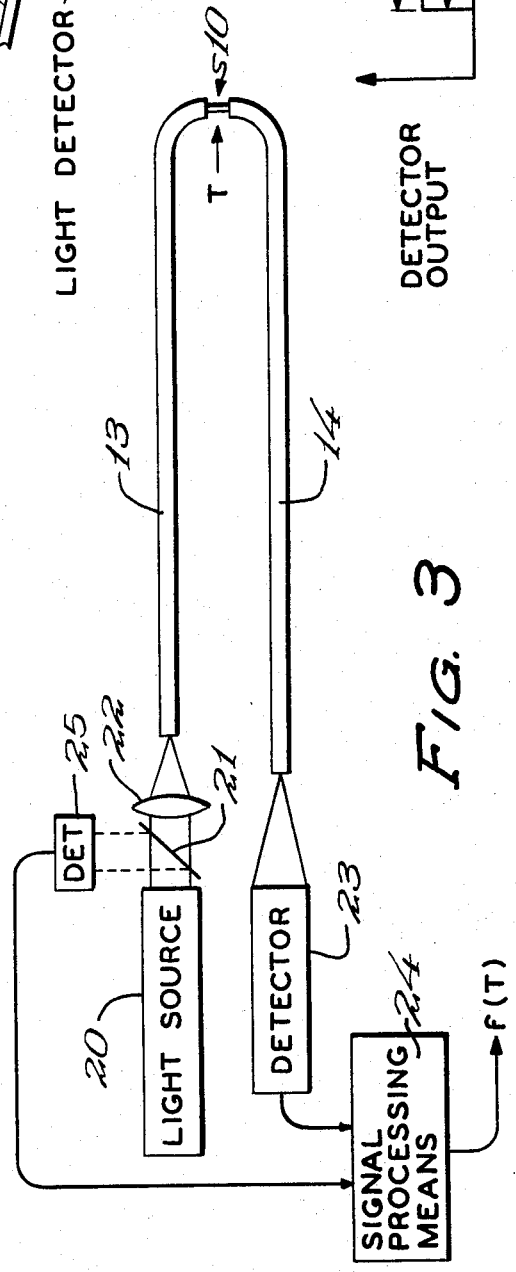

FIBER OPTIC TEMPERATURE SENSOR USING LIQUID COMPONENT FIBER

SUMMARY OF THE INVENTION

This invention provides apparatus for remote temperature sensing by means of fiber optics in which the sensor is optical and passive, with no electrical power or electrical connections required at the sensor. The temperature-sensing section of the fiber optic makes use of a transparent liquid with temperature dependent index of refraction as core or cladding material.

BRIEF DESCRIPTION OF THE DRAWINGS

FIG. 1 is a diagrammatic showing of one embodiment of a fiber optic temperature sensor of the present invention.

FIG. 2 is a similar showing of another embodiment of a fiber optic temperature sensor of the present invention.

FIG. 3 is a block diagram of a system utilizing the invention.

FIG. 4 is an embodiment of a portion of the system of FIG. 3.

FIG. 5 is a graphical representation of the signal generated in the apparatus of FIG. 4.

DESCRIPTION

In this invention directed to remote temperature sensing with optical fibers, there is utilized in one embodiment a short section of temperature-sensitive liquid-core optical fiber inserted in series with a conventional multi-mode optical fiber. The transparent core liquid in the optical fiber has a temperature-sensitive index of refraction. This core liquid and the glass capillary tube containing it form a liquid-core optical fiber with numerical aperture that varies with temperature. At some temperature T1 the liquid and the glass tube have the same refractive index and the numerical aperture is zero. At some other temperature T2 the liquid has a higher refractive index such that the liquid-core optical fiber has the same numerical aperture as the conventional fiber. Over the temperature range T1 to T2 the numerical aperture of the liquid-core optical fiber varies continuously from zero to the value of the numerical aperture of the conventional fiber. This phenomenon is used as the temperature-sensing effect, and the liquid-core fiber as the temperature-sensing element.

In another embodiment, the sensor comprises a length of optical fiber having a section with no cladding. The unclad section of fiber is immersed in a transparent liquid which serves as a cladding whose index of refraction varies with temperature from a value equal to the fiber core index of refraction down to a value equal to the fiber cladding index of refraction as the temperature varies from some value T1' to some other value T2'. (Typical transparent liquids used for index matching in optics have a negative temperature dependence $dn/dT \cong 4 \times 10^{-4}/°C$.). This section of fiber core with temperature-dependent liquid cladding forms an optical guiding fiber with numerical aperture that varies from zero to the maximum value of the conventionally-clad remainder of the fiber over the temperature range T1' to T2'. This phenomenon is used as the temperature-sensing effect, and the liquid-clad fiber section as the temperature-sensing element.

Referring now to the drawings and particularly to the liquid core embodiment shown in FIG. 1, there is shown a temperature-sensitive element 10 comprising a section of transparent capillary tubing 11, such as glass, having an index refraction $n_s$ surrounding a liquid core 12 having an index of refraction $n_L$ which is temperature sensitive. This element 10 is joined in series with a conventional multi-mode input optical fiber 13 and an output optical fiber 14 having a core with index of refraction $n_1$ covered with a cladding with index of refraction $n_2$.

In the liquid clad embodiment shown in FIG. 2, the input and output fibers are the same as described above and carry the same identifying numerals. There is also shown a temperature-sensitive element 10' having an unclad fiber core 12' of index $n_c$ immersed in a transparent liquid cladding 11' which has a temperature-dependent index $n_L'$. The liquid cladding 11' is contained by a suitable shell 15 and seals 16. In this embodiment, the core may be continuous with $n_c = n_1$ from fiber 13 through sensing element 10' to fiber 14, if desired, thereby providing automatic alignment of the core sections.

A block diagram of a system for remote optical temperature sensing is shown in FIG. 3 in which a light source 20, such as a light-emitting diode, transmits light through a conventional beam splitter means 21 and suitable lens means 22 and into the end of input optical fiber 13. The light is directed into the fiber 13 by lens means 22 so that the full numerical aperture of the input fiber is excited. At the remote end of input fiber 13, the coupled temperature-sensing section 10 or 10' passes or transmits a portion (more or less of the full numerical aperture) of the light depending on the temperature of the liquid. The transmitted portion of the light which is now indicative of the temperature is returned from the remote sensing point through the output fiber 14 to a light detector 23 which provides an electrical signal to one input of a signal processing means 24. Part of the light from light source 20 divided off by beam splitter 21 is sensed at light detector 25, which may be of the same type as detector 23, and the electrical signal from detector 25 is connected to the other input of signal processing means 24. In this embodiment, the fraction of the light transmitted through temperature sensing section 10 is a measure of the temperature, and the signal processing means is devised so as to calculate this quantity, using inputs from detectors 23 and 25, independent of changes in the intensity of light source 20, and produce an output signal F(T) proportional to temperature.

The numerical aperture (NA) of the conventional fiber ($NA_f$) is defined as: $NA_f = \sqrt{n_1^2 - n_2^2}$, and is approximately $NA_f \cong \sqrt{2n_1 \Delta n}$ where $\Delta n = n_1 - n_2$ and it is assumed $\Delta n << n_1$. Similarly, the numerical aperture of the liquid-core fiber ($NA_L$) is: $NA_L = \sqrt{n_L^2 - n_s^2}$. The numerical aperture of the liquid-clad section is $NA'_L = \sqrt{n_c^2 - n'^2_L}$. The $NA_L$ for the liquid core and $NA'_L$ for the liquid clad may be different but in the discussion following the stated relationships hold for either case and the term $NA_L$ will be used. For any fiber, the NA is related to the angle to the fiber axis made by the steepest meridional rays to be guided in the fiber ($\theta_{max}$) by: $\sin\theta_{max} = NA/n_{core}$ where $n_{core}$ is the refractive index of the fiber core.

Let the input conventional fiber 13 be excited by a light source over its full numerical aperture, that is, its full range of guided rays. If $NA_L \geq NA_f$, this full range of angles is transmitted through the liquid-core or the liquid-clad fiber, into the output fiber and to a detecting device. For $0 < NA_L < NA_f$, the steeper angle rays in the conventional fiber are not guided in the liquid-core or liquid-clad fiber and so are not transmitted into the output conventional fiber, while the shallow angle rays are guided in the liquid-core or liquid-clad section and are transmitted into the output fiber. When $n_L \leq n_S$, the liquid-core fiber does not guide any light. When $n'_L \geq n_c$, the liquid-clad section does not guide any light.

If steps are taken to ensure that light which is not guided in the liquid-core or liquid-clad fiber does not get to the conventional output fiber, then $NA_L$ can be determined by observing the light transmitted through the output fiber. When observed in a medium of index of refraction $n_o$, the output light will be limited to a range of angles equal to or less than $\theta_o = \arcsin(NA_L/n_o)$ for $0 \leq NA_L \leq NA_f$. Thus, by observing $\theta_o$, the $NA_L$ can be determined; and, if $n_c$, $n_S$ and the temperature dependence of $n_L$ are known as well, the temperature of the liquid-core fiber can be determined.

Steps to ensure that light not guided in the liquid-core fiber does not get to the output fiber 14 can include one or more of the following: (a) bending the liquid-core fiber; (b) frosting the outside of the liquid-core fiber; (c) coating the liquid-core fiber with a light-absorbing material; (d) immersing the liquid-core fiber in a transparent liquid of higher refractive index.

In FIG. 1, the element 10 and the fibers 13 and 14 are shown separated for illustrative simplicity. However, in joining the parts, for maximum light transmission efficiency, the core diameter of conventional and liquid-core fibers should be equal and they should be carefully aligned with no gaps between sections. However, since the temperature sensing effect is the variation of $NA_L$ with temperature and this is independent of fiber diameter, the diameter of the liquid-core fiber is not critical. Its length must be sufficient to eliminate the unguided input rays such as, for example, a few centimeters.

There are a large number of liquids that may be used in this application. For instance, liquids with index of refraction in the useful range of $1.5 < n_L < 1.6$ are commonly available, and virtually any refractive index in this range can be obtained by mixing liquids. Typical temperature dependences of the refractive index are $dn/dT \cong -4 \times 10^{-4}/° C$. The temperature range of operation desired is controlling in choosing the best liquid for a given condition.

A wide variety of index of refraction liquids are sold, for example, by R P Cargille Laboratories, Inc., Cedar Grove, N.J. Liquids with index of refraction from 1.3 to 2.1 are available. Handbooks of Chemistry and Physics include tables of index liquids.

The temperature can be determined from the transmitted light in one of two general ways; (1) by sensing the transmitted intensity, or (2) by sensing the transmitted NA. If all modes of a multi-mode fiber are equally excited, the power transmitted increases as the square of its NA. This effect is usable to relate the intensity transmitted by the fiber optic temperature sensor to the liquid-core or liquid-clad fiber's NA and hence to its temperature.

The transmitted NA may also be measured by allowing the light to expand out of the end of the output fiber and measuring the diameter of this cone of light at a given axial position. The diameter may be measured by a scanning aperture where the aperture size and scan rate are known by measuring the length of time it takes to scan the aperture across the light. The aperture itself can be scanned mechanically, or the light beam can be scanned across it using a rotating mirror 26 as in FIG. 4. In this figure, the rotating mirror 26 is shown to be single faceted and provides a light output to the light detector 23' which can be graphed as shown in FIG. 5 which plots detector output against time. In FIG. 4, the angle $\beta$ varies as a function of temperature so that there exists a relation $$NA = \sin\beta = \sin 2\pi\tau/T \cong 2\pi\tau/T$$

where T is the time of rotation of mirror 26 and $\tau$ is the time light impinges on detector 23'. The single faceted mirror is shown for ease of illustration and the use of double faced or multi-faceted rotating mirrors or prisms may be desirable. When a detector of the nature of FIG. 4 is used, the system of FIG. 3 may be simplified by removing detector 25.

The embodiments of the invention in which an exclusive property or right is claimed are defined as follows:

1. Remote optical type temperature sensor apparatus comprising:
   a length of multi-mode optical fiber having a core and a cladding for transmitting light therethrough and having an input end adapted to be light excited and an output; and,
   a temperature-sensing optical fiber section, positioned at a selected point in the length of optical fiber, the section having a transparent liquid component and a transparent solid component, one of said components comprising a core and the other component a cladding surrounding the core, the transparent solid component having a predetermined index of refraction, the transparent liquid component having a temperature dependent index of refraction so that the light transmitted by said temperature section is a function of sensed temperature.

2. The apparatus according to claim 1 further comprising:
   means including light producing means positioned with respect to the fiber input to excite the fiber over its full numerical aperture; and,
   light detector means positioned at the output of said length of optical fiber to receive the transmitted light and provide an electrical signal representative of the transmitted light.

3. The apparatus according to claim 1 in which the temperature-sensing section has a liquid-core fiber.

4. The apparatus according to claim 1 in which the temperature-sensing section has a liquid-clad fiber.

5. Apparatus for optically sensing temperature comprising:
   means including light producing means and light detecting means;
   fiber optic temperature sensing sensor means including a transparent liquid component and a transparent solid component, one of said components comprising a core and the other component a cladding surrounding the core, the transparent solid component having a predetermined index of refraction, the transparent liquid component having a temperature-dependent index of refraction;
   a length of multi-mode optic fiber having a core and a cladding and having a predetermined numerical aperture; and,
   an optic loop including said optic fiber optically connecting said light producing means to said light detecting means by way of said sensor means whereby the light travels through said optic fiber and sensor means to reach said light detecting means.

6. The apparatus according to claim 5 and further comprising means for directing the light from said light producing means into one end of said fiber so that the fiber is excited over its full predetermined numerical aperture.

* * * * *